United States Patent
Georgiou et al.

(10) Patent No.: US 11,605,290 B2
(45) Date of Patent: Mar. 14, 2023

(54) UPDATING MAPS BASED ON TRAFFIC OBJECT DETECTION

(71) Applicant: GM Cruise Holdings LLC, San Francisco, CA (US)

(72) Inventors: Georgios Georgiou, San Francisco, CA (US); Clement Creusot, San Francisco, CA (US); Matthias Wisniowski, Vienna (AT)

(73) Assignee: GM Cruise Holdings LLC., San Francisco, CA (US)

( * ) Notice: Subject to any disclaimer, the term of this patent is extended or adjusted under 35 U.S.C. 154(b) by 217 days.

(21) Appl. No.: 16/774,794

(22) Filed: Jan. 28, 2020

(65) Prior Publication Data

US 2021/0233390 A1  Jul. 29, 2021

(51) Int. Cl.
*G05D 1/00* (2006.01)
*G08G 1/01* (2006.01)
*G01C 21/32* (2006.01)

(52) U.S. Cl.
CPC .......... *G08G 1/0112* (2013.01); *G01C 21/32* (2013.01); *G05D 1/0088* (2013.01); *G08G 1/0133* (2013.01); *G05D 2201/0213* (2013.01)

(58) Field of Classification Search
CPC .... G08G 1/0112; G08G 1/0133; G01C 21/32; G01C 21/3811; G01C 21/3819; G01C 21/3837; G01C 21/3841; G01C 21/3848; G01C 21/3859; G01C 21/3896; B60W 60/001; G05D 2201/0213
USPC .................................................. 701/23–28
See application file for complete search history.

(56) References Cited

U.S. PATENT DOCUMENTS

| | | | | |
|---|---|---|---|---|
| 8,482,431 | B2 * | 7/2013 | Kushi | G08G 1/161 340/901 |
| 9,409,571 | B2 * | 8/2016 | Lueke | B60W 50/14 |
| 9,720,412 | B1 * | 8/2017 | Zhu | G05D 1/021 |
| 9,779,314 | B1 * | 10/2017 | Wendel | B60W 30/00 |
| 10,037,689 | B2 * | 7/2018 | Taylor | G05D 1/0285 |
| 10,217,357 | B1 * | 2/2019 | Elsheemy | G08G 1/0112 |
| 10,600,319 | B1 * | 3/2020 | Shuff | G08G 1/0116 |
| 11,037,005 | B2 * | 6/2021 | Li | G06N 3/0454 |

(Continued)

FOREIGN PATENT DOCUMENTS

| | | | | | |
|---|---|---|---|---|---|
| JP | 2014215205 | A | * | 11/2014 | G01C 21/26 |
| JP | 2014215205 | A | * | 11/2014 | |
| WO | WO-2019222358 | A1 | * | 11/2019 | G01C 21/3602 |

*Primary Examiner* — Jonathan L Sample
(74) *Attorney, Agent, or Firm* — Polsinelli PC

(57) ABSTRACT

Systems, methods, and computer-readable media are provided for receiving traffic object data from a plurality of autonomous vehicles, comparing the traffic object data of each of the plurality of autonomous vehicles with known traffic object data, determining a discrepancy between the traffic object data of each of the plurality of autonomous vehicles and the known traffic object data, grouping the traffic object data of each of the plurality of autonomous vehicles based on the determining of the discrepancy between the traffic object data of each of the plurality of autonomous vehicles and the known traffic object data, determining whether a group of traffic object data of the grouping of the traffic object data of each of the plurality of autonomous vehicles exceeds a threshold, and updating a traffic object map based on the traffic object data of the group that exceeds the threshold.

22 Claims, 6 Drawing Sheets

(56) References Cited

U.S. PATENT DOCUMENTS

| | | |
|---|---|---|
| 11,340,094 B2* | 5/2022 | Jiang .................. G01S 17/89 |
| 2017/0069208 A1* | 3/2017 | Nair .................. G01C 21/3602 |
| 2017/0221366 A1* | 8/2017 | An .................. G08G 1/096758 |
| 2018/0061237 A1* | 3/2018 | Erickson .............. G08G 1/0112 |
| 2018/0190116 A1* | 7/2018 | Bauer .................. G08G 1/0141 |
| 2018/0224860 A1* | 8/2018 | Warshauer-Baker ........................ G05D 1/0088 |
| 2018/0345961 A1* | 12/2018 | Saigusa ............. B60W 30/0956 |
| 2019/0080186 A1* | 3/2019 | Zhai ..................... G06V 10/147 |
| 2019/0250626 A1* | 8/2019 | Ghafarianzadeh ... G06K 9/6282 |
| 2019/0377349 A1* | 12/2019 | van der Merwe ..... G06Q 10/08 |
| 2020/0183386 A1* | 6/2020 | Creusot ................ G06V 20/584 |
| 2020/0320875 A1* | 10/2020 | Lacaze ..................... G08G 1/22 |
| 2020/0409363 A1* | 12/2020 | Gogna .................. G05D 1/0276 |
| 2021/0009161 A1* | 1/2021 | Kim ..................... B60W 30/12 |
| 2021/0064057 A1* | 3/2021 | Eldar .................... G08G 1/167 |
| 2021/0142658 A1* | 5/2021 | Grimm ................. G06V 20/20 |
| 2021/0156704 A1* | 5/2021 | Gibson ............... G06K 9/3233 |

* cited by examiner

UPDATING MAPS BASED ON TRAFFIC OBJECT DETECTION

BACKGROUND

1. Technical Field

The subject technology provides solutions for updating maps based on object detection and in particular, for updating traffic maps for autonomous vehicles based on discrepancies of a traffic object detected with a camera.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

In an autonomous vehicle environment, the environment itself continuously changes over time, which may dictate updates to internal maps of the autonomous vehicle environment. For example, traffic object position (e.g., traffic light, traffic signal, or traffic sign), type, and lane association can change abruptly due to construction or a car accident. If traffic maps are not updated accordingly with information received from sensors of the autonomous vehicles in a fleet, there is the risk of an autonomous vehicle entering an intersection when the autonomous vehicle does not have the "right of way." For example, according to the autonomous vehicle's current map, a stop sign should be at an intersection, when in actuality, the stop sign has been replaced with a traffic signal because of construction. Without an updated traffic map, the autonomous vehicle would enter the intersection thinking that it had the right of way, when in actuality, the autonomous vehicle is running a red traffic signal.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for improvements in vehicle sensor technologies and capabilities. In some examples, a sensor positioning platform on an autonomous vehicle can include multiple co-located sensors that can be dynamically rotated or repositioned for optimal sensor coverage. The sensors can be mounted on a rotating sensor carrier structure of the sensor positioning platform, which functions as an azimuth positioning stage for the sensors. The sensor positioning platform can include a motor for moving, repositioning, and/or rotating the sensors and sensor carrier structure, and electrical components for controlling the movement, repositioning, and/or rotation of the sensors and sensor carrier structure through the motor. The sensor positioning platform can also include a sensor cleaning system that allows the sensors in the rotating sensor carrier structure to be cleaned as needed, a cable management system that interconnects the sensors with other electrical components of the autonomous vehicle and provides a freedom of movement that enables the sensors to remain connected when rotating, and other components as described herein.

The sensor positioning platform can receive (e.g., from a computing system on the autonomous vehicle) commands for moving, repositioning, and/or rotating the sensors and sensor carrier structure. Thus, through the sensor positioning platform, the sensors can be repositioned to increase sensor coverage, provide instantaneous field of view, and target specific areas or objects. The sensors can also be repositioned to account for changes in the vehicle's motion, driving angles and direction, as well as relative changes in the vehicle's environment and the motion, angle, and position of surrounding objects. The dynamic and adaptable sensor repositioning herein can improve the sensors' visibility, accuracy, and detection capabilities. The sensor repositioning platform can allow autonomous vehicles to monitor their surroundings and obtain a robust understanding of their environment. The sensor repositioning platform and associated functionality can also provide benefits in cost, sensor data redundancy, and sensor fusion.

Figure 1:
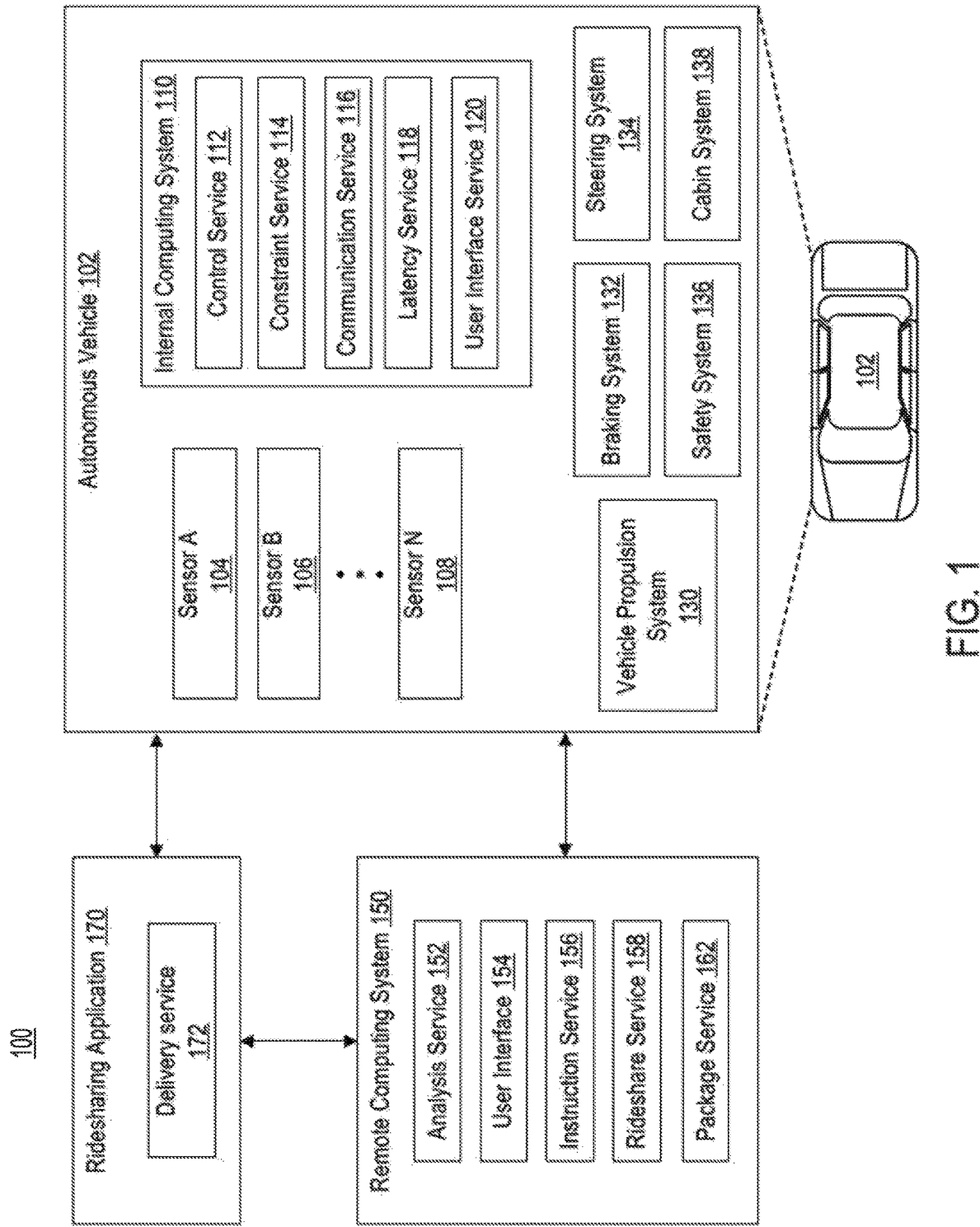
FIG. 1 illustrates an example autonomous vehicle environment including a computing system in communication with an autonomous vehicle.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), $3^{rd}$ Generation (3G), $5^{th}$ Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
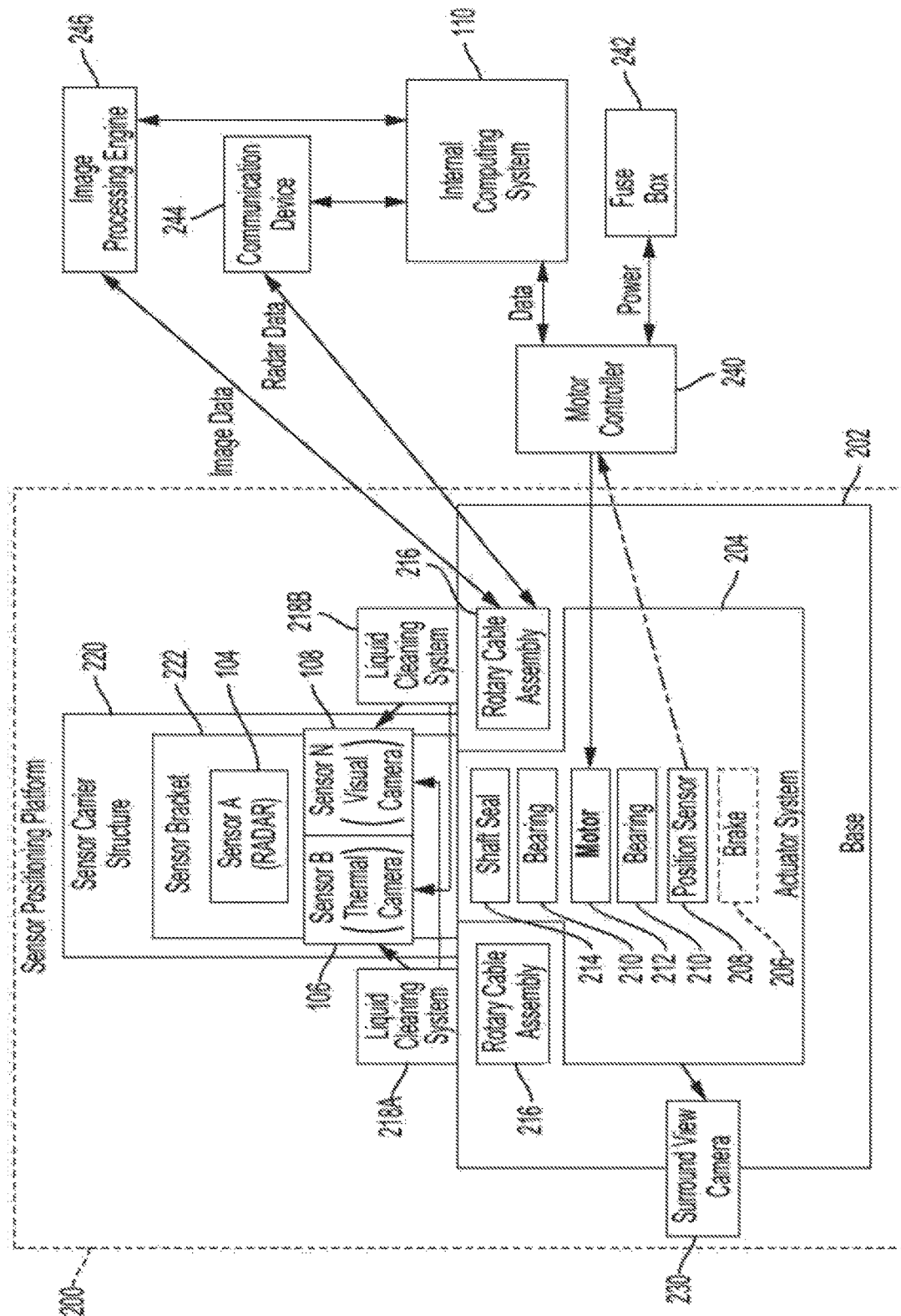
FIG. 2 is a block diagram of an example sensor positioning platform for mechanically moving, rotating, and/or positioning a payload of sensors on an autonomous vehicle, in accordance with some examples.

FIG. 2 is a block diagram of an example sensor positioning platform 200 for mechanically moving, rotating, and/or positioning sensors 104-108 on a sensor carrier structure 220 implemented by the autonomous vehicle 102. The sensor positioning platform 200 can be attached to, coupled with, and/or otherwise secured to the autonomous vehicle 102. The sensor carrier structure 220 with the sensors 104-108 can be situated outside of the autonomous vehicle 102 in order to have access to, and/or visibility into, the external or outside environment (e.g., outside or external to the autonomous vehicle 102) so the sensors 104-108 can capture sensor data or measurements pertaining to the outside environment, conditions or characteristics of the outside environment, objects or humans located in the outside environment, etc.

In addition to providing the sensors 104-108 access to, and/or visibility into, the external or outside environment, as further described herein, the sensor positioning platform 200 can mechanically move, rotate, and/or reposition the sensor carrier structure 220 to allow the sensors 104-108 on the sensor carrier structure 220 to capture sensor data or measurements for different areas or regions of the outside environment, extend the addressable field of regard, extend and/or provide an instantaneous field of view, provide sensor visibility or access into a focused or specific area or object, account for different angles, account for different vehicle maneuvers, etc. The sensor data or measurements can be used to detect objects (e.g., other vehicles, obstacles, traffic signals, signs, etc.), humans, animals, conditions (e.g., weather conditions, visibility conditions, traffic conditions, road conditions, etc.), route or navigation conditions, and/or any other data or characteristics associated with the outside environment.

In some examples, the autonomous vehicle 102 can use the sensor data or measurements to perform (or when performing) one or more operations, such as mapping operations, tracking operations, navigation or steering operations, safety operations, braking operations, maneuvers, etc. For example, the autonomous vehicle 102 can use the sensor data or measurements to gain insight or visibility into the outside environment and the outside environment conditions. The autonomous vehicle 102 can then use such insight when making navigation decisions, such as determining a velocity, determining a maneuver, determining how to avoid an object, determining a trajectory, determining navigation changes (e.g., changes in position, velocity, angle, direction, etc.), and so forth.

The sensor positioning platform 200 can include a base 202. The base 202 can include an actuator system 204 and one or more rotary cable assemblies 216. Moreover, the one or more rotary cable assemblies 216 can include power and/or communication lines (e.g., cables, wires, flexible printed circuits, etc.) for supplying power to the sensors 104-108 on the sensor carrier structure 220 and carrying data to and/or from the sensors 104-108.

In some examples, the one or more rotary cable assemblies 216 can feed power and communication lines to the sensors 104-108 for powering the sensors 104-108 and communicatively connecting (directly or indirectly) the sensors 104-108 to the internal computing system 110 and/or the actuator system 204, while allowing the sensors 104-108 to have freedom of movement in order to rotate with the sensor carrier structure 220 while receiving power and remaining communicatively connected to the internal computing system 110 and/or the actuator system 204.

In some cases, the one or more rotary cable assemblies 216 can include data lines that connect the sensors 104-108 to a communications device 244 and/or an image processing engine 246. The data lines can allow the sensors 104-108 to communicate with the communications device 244 to send and receive data signals (e.g., sensor data, instructions, commands, information, etc.) to and from the communications device 244. Moreover, the data lines can allow image sensors (106, 108) on the sensor carrier structure 220 to provide, to the image processing engine, image data (e.g., images, videos, frames, etc.) captured by such image sensors.

The communications device 244 can include, for example and without limitation, a network interface, a switch, a hub, a relay/proxy, or any other network device capable of switching, forwarding, and/or routing data. In some implementations, the communications device 244 can support network communications over or across one or more networks, such as a private network (e.g., a LAN), a public network (e.g., a WAN, a cloud network, etc.), a hybrid network, etc. For example, the communications device 244 can support wireless communications, such as cellular communications, WIFI communications, etc.; wired or cable communications, such as Ethernet communications, fiber optic communications, etc.; and/or any other type of communications.

The communications device 244 can be communicatively connected with the internal computing system 110 and/or any other computing device, and can thus send and/or receive data to and/or from the internal computing system 110 and/or any other computing devices. Thus, the communications device 244 can route or forward data between the sensors 104-108 and the internal computing system 110 (or any other computing device). Moreover, in some cases, the communications device 244 can be part of, or implemented by, the internal computing system 110.

The image processing engine 246 can be part of, or implemented by, the internal computing system 110 or a separate computing device. Moreover, in some cases, the image processing engine 246 can be part of, or implemented by, a same computing system as the communications device 244. For example, both the image processing engine 246 and the communications device 244 can be part of, or implemented by, the internal computing system 110 or a separate computing device.

The image processing engine 246 can receive image data (e.g., images, frames, videos, etc.) from image sensors (e.g., 106, 108) on the sensor carrier structure 220 and perform one or more image processing and/or pre-processing operations on the image data, such as, for example and without limitation, filtering, scaling, sub-sampling, color correction, color conversion, geometric transformations, noise reduction, demosaicing, spatial filtering, image restoration, image enhancement, frame rate conversion (e.g., up-conversion, down-conversion), segmentation, feature extraction, etc. The image processing engine 246 can then provide the processed image data to the internal computing system 110 for further use, processing, analysis, etc.

The actuator system 204 can be configured to control a position, angle, and/or movement of the sensor carrier structure 220 and the sensors 104-108 on the sensor carrier structure 220. For example, the actuator system 204 can include a motor 212 for controlling the positioning, rotation, and/or movement of the sensor carrier structure 220 hosting the sensors 104-108, as further described herein. The motor 212 on the actuator system 204 can receive, from a motor controller 240, a command instructing the motor 212 to move or rotate the sensor carrier structure 220 with the sensors 104-108 to a specific angle and/or position in order to change the angle, position, and/or field-of-view (FOV) of the sensors 104-108 on the sensor carrier structure 220.

In some examples, the motor 212 can be an electrical motor capable of converting electrical energy into mechanical energy that the motor 212 can use to move the sensor carrier structure 220 and the sensors 104-108 in the sensor carrier structure 220. In some implementations, the motor 212 can be a gimbal motor. Moreover, the motor controller 240 can include one or more electronic circuits (e.g., one or more microprocessors, microcontrollers, central processing units (CPUs), graphics processing units (GPUs), digital signal processors (DSPs), and/or any other suitable electronic circuits or hardware), and/or can include and/or can be implemented using computer software, firmware, or any combination thereof, to perform the various operations described herein.

In some examples, the motor controller 240 can include one or more computing and/or electronic components, such as one or more CPUs, Input/Output (I/O) ports or peripherals, timers, memories (e.g., electrically erasable programmable read-only memory (EEPROM), read-only memory (ROM), random-access memory, and the like), controllers, processors, storage devices, and/or any other electronic circuits or hardware. Moreover, the motor controller 240 can include memory (not shown), such as EEPROM, for storing data, firmware, software, and/or any combination thereof.

The motor controller 240 can send control signals to the motor 212 to move, rotate, and/or control the motor 212, which can then move, rotate, and/or position the sensor carrier structure 220 with the sensors 104-108 to a specific position, angle, and/or location. In some cases, the motor controller 240 can generate the control signals based on, and/or in response to, one or more commands or instructions received by the motor controller 240 from the internal computing system 110 on the autonomous vehicle 102. For example, the internal computing system 110 can send commands or instructions to the motor controller 240 for mechanically moving, rotating, and/or positioning the sensor carrier structure 220 with the sensors 104-108 and/or the motor 212 on the sensor positioning platform 200. The motor controller 240 can receive such commands or instructions, parse the commands or instructions, generate one or more control signals based on the commands or instructions, and send the one or more control signals to the motor 212 on the actuator system 204, which can cause the motor 212 to move the sensor carrier structure 220 with the sensors 104-108 to a specific position, angle, and/or location.

In some cases, when generating control signals, the motor controller 240 can calculate a difference between a requested position (e.g., specified in the commands or instructions received from the internal computing system 110) of the motor 212 (and the sensor carrier structure 220 with the sensors 104-108) and an actual or current position of the motor 212 (and the sensor carrier structure 220 with the sensors 104-108). For example, the motor controller 240 can obtain sensor data from a position sensor 208 in the actuator system 204, which can include measurements of a current or actual position of the motor 212, and use such measurements to determine a current or actual position of the motor 212. The motor controller 240 can use the current or actual position of the motor 212 to calculate an error or difference between the current or actual position of the motor 212 and the requested position for repositioning the motor 212 (and the sensor carrier structure 220 with the sensors 104-108).

The motor controller 240 can then use the calculated error or difference to make any adjustments to the position defined in the one or more control signals for the motor 212. In some cases, the motor controller 240 can continuously receive position measurements from the position sensor 208 to calculate such errors or differences, and make adjustments to the position specified in the control signals to the motor 212. This way, the motor controller 240 can fine tune the position specified in the control signals to the motor 212 to account for any such errors and increase an accuracy of the position adjustments of the motor 212 (and the sensor carrier structure 220 of sensors 104-108).

The position sensor 208 used to obtain position measurements for the motor 212 can include one or more sensor devices, which can include any type of sensor, encoder, transducer, detector, transmitter, and/or sensing component capable of measuring the position (e.g., linear, angular, etc.) and/or change of position of a target or object, such as the motor 212. Non-limiting examples of position sensors (208) that can be used to obtain position measurements (e.g., displacement, linear position, angular position, etc.) for the motor 212 include optical encoders, potentiometers, magnetic position sensors (e.g., Hall effect sensors, magnetorestrictive position sensors, etc.), rotary encoders, linear encoders, capacitive position sensors, inductive position sensors (e.g., resolvers, linearly variable differential transformers, etc.), fiber-optic position sensors, photodiode arrays, incoders, etc. These examples are not exhaustive and are simply provided for explanation purposes, as any other types of position sensors are also contemplated herein.

The position sensor 208 can reside under the motor 212, along an outside of the motor 212, along an outside of a rotor of the motor 212, along an outside of a stator of the motor 212, and/or in any other location that allows the position sensor 208 to obtain positioning measurements for the motor 212 and fit within an assembly (e.g., 202) of the actuator system 204. For example, in some implementations, the position sensor 208 can determine the position of the motor 212 using a multi-pole magnetic strip. The multi-pole magnetic strip can be located on an outside of the motor 212, a rotor of the motor 212, a stator of the motor 212, and/or any other location that allows the multi-pole magnetic strip to determine the position of the motor 212. In some cases, the multi-pole magnetic strip can sit flush along the outside of the rotor of the motor 212.

In some examples, when generating control signals for the motor 212, the motor controller 240 can translate the control signals into a format and power level that can move the motor 212 to a specific position. The specific position can be defined in the one or more control signals as previously explained. The motor controller 240 can transmit the translated signals to the motor 212 in order to move the motor 212 to the specific position. Based on the translated signal from the motor controller 240, the motor 212 can move the sensor carrier structure 220 containing the sensors 104-108 in order to move or reposition the sensors 104-108 to the specific position.

In some examples, the motor controller 240 can be electrically coupled with a fuse box 242. The fuse box 242 can control the electrical flow and power to the motor controller 240. Moreover, the motor controller 240 can be communicatively connected to the internal computing system 110. The internal computing system 110 and the motor controller 240 can thus communicate data (e.g., instructions, commands, signals, sensor data, motor repositioning data, requests, information, content, etc.) to each other. In some cases, the motor controller 240 can send and/or receive data (e.g., instructions, commands, signals, sensor data, motor repositioning data, requests, information, content, etc.) to and/or from other devices through the internal computing system 110. For example, the motor controller 240 can send and/or receive data from sensors (e.g., 104-108), a remote computing system (e.g., 150), and/or any other remote device or location, through the internal computing system 150. Here, the internal computing system 150 can relay such data to and/or from the motor controller 240. In other cases, the motor controller 240 can communicate directly (or without going through the internal computing system 110) with other remote devices or locations.

In some examples, the motor controller 240 can include a communication interface that supports network communications to allow the motor controller 240 to communicate over one or more networks, such as a private network (e.g., a LAN), a public network (e.g., a WAN, a cloud network, etc.), a hybrid network, etc. For example, the motor controller 240 can include a communication interface that supports wireless communications, such as cellular communications, WIFI communications, etc.; wired or cable communications, such as Ethernet communications, fiber optic communications, etc.; and/or any other type of communications.

The sensor carrier structure 220 can be attached, coupled, or otherwise secured to the base 202 in a manner that allows the sensor carrier structure 220 to rotate and/or move relative to the base 202. Moreover, the sensors 104-108 can be attached, coupled, fixed, or otherwise secured to the sensor carrier structure 220 via a coupling or securing component, such as a sensor bracket 222. In some examples, the sensors 104-108 can be co-located on the sensor carrier structure 220. Thus, by moving or repositioning the sensor carrier structure 220, the motor 212 can also move or reposition the sensors 104-108 on the sensor carrier structure 220. Also, by affixing and/or co-locating the sensors 104-108 on the sensor carrier structure 220, any need to calibrate the sensors 104-108 or monitor their relative position can be reduced or eliminated, as the position (actual and relative) of the sensors 104-108 can be fixed and known.

The sensor carrier structure 220 can include, for example and without limitation, an articulating or positioning stage, frame, or platform for the sensors 104-108. For example, the sensor carrier structure 220 can be an azimuth positioning stage for the sensors 104-108. Moreover, in some examples, the sensor carrier structure 220 can be attached, coupled, fixed or otherwise secured to the actuator system 204.

In some cases, the base 202 and/or the sensor carrier structure 220 can be attached, coupled, fixed, placed, or otherwise secured to an external portion of the autonomous vehicle 102 to provide the sensors 104-108 access to, and/or visibility into, the outside or external environment. For example, the base 202 and the sensor carrier structure 220 can be securely placed on a pillar, such as an A-pillar, of the autonomous vehicle 102. In this example, the base 202 and the sensor carrier structure 202 can reside on an outside of the autonomous vehicle 102 between the windshield, the hood of the autonomous vehicle 102, and the passenger or driver's side. Thus, the sensors 104-108 can reside outside of the autonomous vehicle 102 and have access to, and/or visibility into, the outside or external environment.

In other cases, a portion of the base 202 and/or the sensor carrier structure 220 can be attached, coupled, fixed, placed, or otherwise secured to an internal portion of the autonomous vehicle 102, with another portion of the base 202 and/or the sensor carrier structure 220 extending, extruding, protruding, projecting and/or sticking out from the autonomous vehicle 102 to an outside of the autonomous vehicle 102. This way, the sensors 104-108 can reside outside of the autonomous vehicle 102 and thus have access to, and/or visibility into, the outside or external environment.

The motor 212 can move the sensor carrier structure 220 and the sensors 104-108 any number of times as previously described, in order to adjust the position or angle of the sensors 104-108 as desired and thus the visibility and/or coverage of the sensors 104-108. For example, the motor 212 can move the sensor carrier structure 220 and the sensors 104-108 as requested, periodically (e.g., at specific or random time intervals), randomly, and/or in response to one or more events, such as a maneuver of the autonomous vehicle 102, a change in position or motion of the autonomous vehicle 102, a detected human or object (e.g., another vehicle, a traffic sign, an object on the road, a guardrail, etc.), a detected condition (e.g., a condition of the autonomous vehicle 102, a condition of the external environment, a traffic condition, a road condition, a safety condition or threat, etc.), a navigation instruction, a predicted navigation event, etc.

The actuator system 204 can include bearings 210 to support movement of, and reduce friction between, one or more moving parts of the motor 212, such as a rotor and a stator. The bearings 210 can also provide increased axial, radial, and moment load capacity to the motor 212. Moreover, the bearings 210 can be in contact with one or more elements or portions of the motor 212, as further described herein.

In some examples, the actuator system 204 can also include a shaft seal 214 to seal rotary elements (and/or elements in relative motion) in the actuator system 204, such as the motor 212, a shaft of the motor 212, a rotor of the motor 212, a rotating bore of the motor 212, etc. In some cases, the shaft seal 214 can be located between the sensor carrier structure 220 and the actuator system 204. In other cases, the shaft seal 214 can be located between the actuator system 204 and the base 202 and/or between the sensor carrier structure 220 and the base 202.

In some implementations, the actuator system 204 can optionally include a brake 206. The brake 206 can be configured to hold and/or control a movement of the motor 212. In some cases, the brake 206 can be configured to control and/or manage a holding torque of the motor 212. Moreover, in some examples, the brake 206 in the actuator system 204 can be implemented below the motor 212 and the position sensor 208.

In some implementations, the base 202 can house the actuator system 204 and the rotary cable assembly 216 and can have a small and/or cylindrical form factor. In other examples, the base 202 can have any other size, shape or design. Moreover, the base 202 can have one or more hollow sections, such as a hollow shaft, for cables to pass through (e.g., from the bottom and through the middle of the assembly) the assembly to the rotary cable assembly 216, to the top of the base 202, and/or to the sensors 104-108 on the sensor carrier structure 220.

In some cases, one or more of the electronic components or hardware in the base 202 and/or the actuator system 204 can be implemented by one or more printed circuit boards (PCBs) or electronic circuits. Moreover, in some examples, the base 202 and/or the actuator system 204 can include a memory or storage device for storing data, a power supply for powering electronic components, a communication interface for communicating with other devices, and/or one or more processing components.

In some implementations, the sensor positioning platform 200 can include a surround view camera 230. The surround view camera 230 can be included in, mounted on, coupled with, or otherwise secured to the base 202 of the sensor positioning platform 200. In some cases, the sensor positioning platform 200 can also include cleaning systems 218A-B for cleaning one or more of the sensors 104-108 on the sensor carrier structure 220. For example, the sensor positioning platform 200 can include a liquid cleaning system 218A and an air cleaning system 218B for using liquid and air to clean image sensors (e.g., 106, 108) on the sensor carrier structure 220. The liquid cleaning system 218A and the air cleaning system 218B can each include a discharge element such as a nozzle, vent, or spraying device for controlling and enabling the flow, discharge, and/or projection of liquid and/or air to the sensors on the sensor carrier structure 220.

The liquid cleaning system 218A and the air cleaning system 218B can also include a hose, pipe, tube, enclosed chamber, or enclosed carrier element, which can be attached, coupled, connected, affixed, or secured to the discharge element and can carry, provide, and/or direct liquid and air to the liquid cleaning system 218A and the air cleaning system 218B. The discharge elements in the liquid cleaning system 218A and the air cleaning system 218B can receive liquid and air from their respective hoses, pipes, tubes, enclosed chambers, or enclosed carrier elements, and can output (e.g., discharge, spray and/or project) the received liquid and air towards sensors on the sensor carrier structure 220 in order to clean those sensors.

In some implementations, the liquid cleaning system 218A and the air cleaning system 218B can be positioned on a stationary portion of the sensor positioning platform 200, such as a stationary portion of the base 202, as further described herein. The liquid cleaning system 218A and air cleaning system 218B can output the liquid and air when the sensors 104-108 on the sensor carrier structure 220 move or rotate within an output range of the liquid cleaning system 218A and air cleaning system 218B. In some examples, the liquid cleaning system 218A and air cleaning system 218B can output the liquid and air as sensors rotate or move within an output range.

In other examples, the actuator system 204 can move the sensors (e.g., by moving the sensor carrier structure 220) within an output range of the liquid cleaning system 218A and air cleaning system 218B when a sensor cleaning operation is to be performed. In some cases, the actuator system 204 can also move or rotate such sensors several times within a range of the liquid cleaning system 218A and air cleaning system 218B to change the positioning of the sensors, increase a coverage of the cleaning liquid and air on the sensors and/or ensure optimal cleaning of the sensors.

In other implementations, the liquid cleaning system 218A and air cleaning system 218B can be positioned on a rotating portion of the sensor positioning platform 200, such as the sensor carrier structure 220, as further described herein. The liquid cleaning system 218A and the air cleaning system 218B can be positioned on the rotating portion at a respective location relative to the sensors 104-108 on the sensor carrier structure 220. The respective location can be within an output range that allows liquid and air outputted by the liquid cleaning system 218A and air cleaning system 218B to reach and clean sensors on the sensor carrier structure 220.

In some examples, the motor controller 240, the fuse box 242, the communications device 244, and/or the image processing engine 246 described above can be part of, or implemented by, the sensor positioning platform 200. In other examples, the motor controller 240, the fuse box 242, the communications device 244, and/or the image processing engine 246 described above can be separate from the sensor positioning platform 200.

While the sensor positioning platform 200 and the actuator system 204 are shown in FIG. 2 to include certain components, one of ordinary skill will appreciate that the sensor positioning platform 200 and/or the actuator system 204 can include more or fewer components than those shown in FIG. 2. For example, in some instances, the sensor positioning platform 200 and/or the actuator system 204 can include one or more different or additional components such as one or more memory components (e.g., one or more RAMs, ROMs, caches, buffers, and/or the like), one or more processing devices that are not shown in FIG. 2, one or more transistors, one or more data communication components (e.g., network interfaces, communication devices, antennas, etc.), one or more storage devices (e.g., one or more hard drives, one or more solid-state drives, and/or the like), one or more circuits that are not shown in FIG. 2, one or more sensors that are not shown in FIG. 2, and/or any other electronic or mechanical component.

Figure 3:
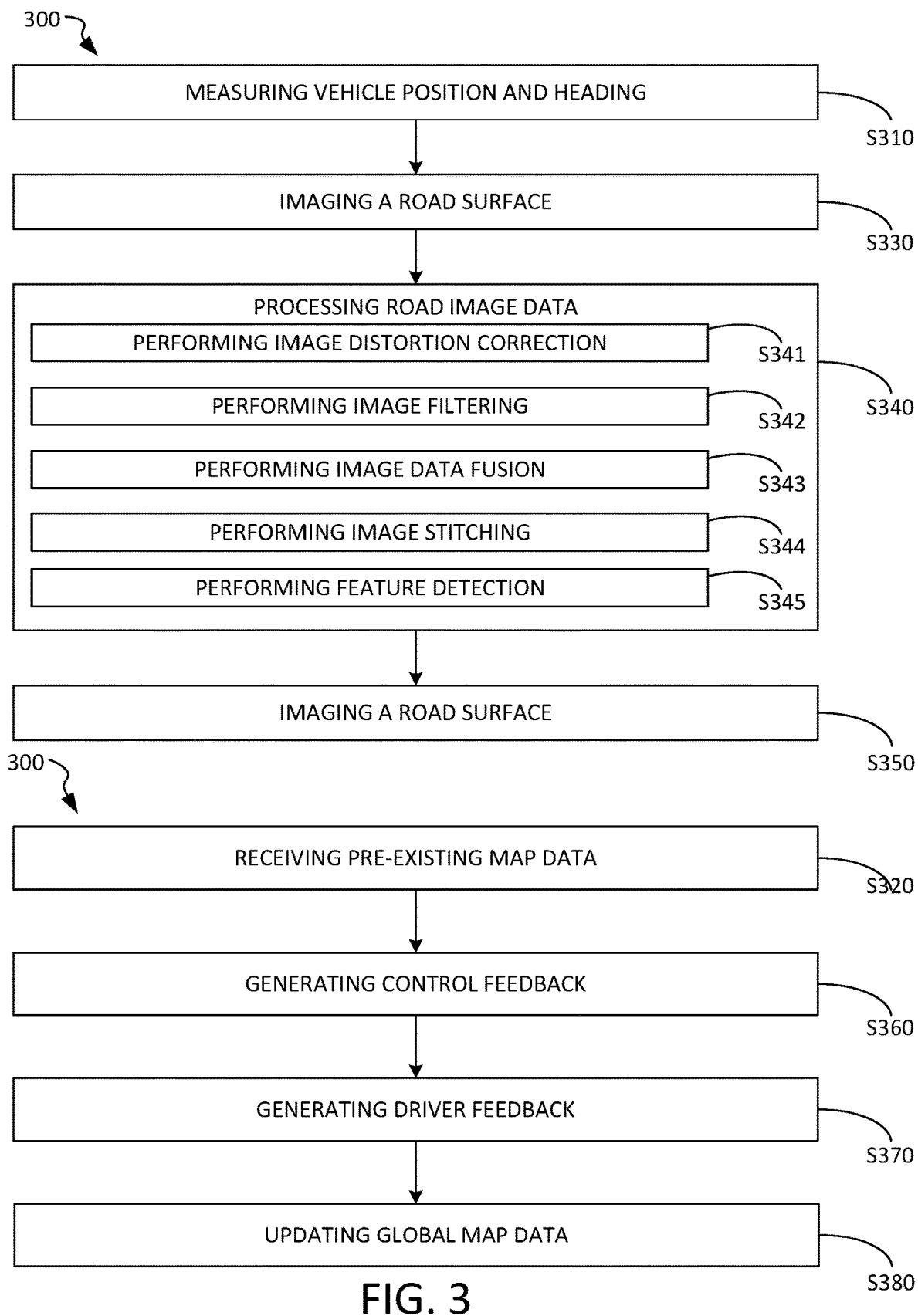
FIG. 3 illustrates an example method for localizing a vehicle, in accordance with some examples.

FIG. 3 is an example method of vehicle localization. A person of ordinary skill in the art would recognize that additional and/or alternative localization methods can be implemented. As shown in FIG. 3, a method 300 for image-based vehicle localization includes measuring vehicle position and heading S310, imaging a road surface S330, processing road image data S340, and generating a local map S350. The method 300 may additionally or alternatively include receiving pre-existing map data S320, generating control feedback S360, generating driver feedback S370 and/or updating global map data S380.

The method 300 can function to enable localization of a vehicle relative to its surroundings (e.g., lane markers or other road surface markings) to increase safety, accuracy, and performance for driver assistance and vehicle automation systems.

The method 300 can be operable using an image capture and processing system coupled to a motor vehicle. The method 300 can be intended for implementation with mass-manufactured automobiles, but may additionally or alternatively be implemented in any suitable motor vehicle; for example, watercraft, light machinery, motorcycles, etc. In the present application, examples are presented under the assumption of implementation in an automobile. A person of ordinary skill in the art will recognize that the details of these examples may be modified for alternative implementations. The following paragraphs will assume operating of the method 300 in an image capture system coupled to an automobile (i.e., 'the car').

The image capture system operating the method 300 can include a front-facing camera and a rear-facing camera, but may additionally or alternatively include only a single one of these cameras, additional cameras, and/or other image capture means. The image capture system can include RGB visible light cameras, but may additionally or alternatively include any suitable image capture devices, including monochrome visible light cameras, infrared cameras, depth cameras, etc.

The image capture system can also include a computing device for performing image processing, but may additionally or alternatively offload some or all computational duties to remote servers (e.g., in the cloud) or any other suitable computers.

The image capture system may be coupled to any sensors that may aid in or be relevant to vehicle localization, e.g., photodetectors, RADAR, SONAR, LIDAR, GPS, inertial measurement units (IMUs), microphones, strain gauges, pressure monitors, barometers, thermometers, altimeters, etc.

The image capture system may additionally or alternatively be coupled to any vehicle control systems aiding in vehicle automation, including steering, brake, and/or throttle interfaces.

The image capture system may additionally or alternatively be coupled to any user control interfaces (e.g., buttons, touchscreens, knobs, etc.).

S310 can include measuring vehicle position and heading. S310 can include measuring vehicle position and heading using a Global Navigation Satellite System (GNSS) receiver (e.g., GPS receiver), but may additionally or alternatively include measuring vehicle position and/or heading in any manner.

S310 can include measuring global position (e.g., latitude and longitude), but may additionally or alternatively include measuring relative position (e.g., distance and orientation relative to a real-time kinematic (RTK) GNSS base station, displacement from a radio tower, etc.).

S310 can include measuring position using standard GNSS navigation techniques, but may additionally or alternatively include measuring position using RTK GNSS techniques, triangulation/trilateration techniques (e.g., using cellular towers), visual techniques (e.g., matching images to images with known locations), and/or any other suitable techniques. For example, S310 may include measuring position using dead-reckoning techniques (e.g., using accelerometer data to estimate change in position from a previous location with known position).

S310 can include measuring heading using standard GNSS techniques, but may additionally or alternatively include measuring heading using a GNSS Compass technique (i.e., using two receivers separated by a known distance to generate heading), using a magnetic compass, using a gyrocompass, using an accelerometer, inferring heading from change in position, using visual data, and/or in any other manner.

S310 can include measuring global heading (e.g., degrees from magnetic north) but may additionally or alternatively include measuring relative heading (e.g., heading relative to a roadway, heading relative to other cars, etc.).

In one example, S310 can include determining heading relative to a highway lane by measuring distortion of a road feature (e.g., a lane marker) as imaged by camera mounted on the vehicle. For example, angle of a lane marker may correspond to an angle of the vehicle relative to a road (or a lane in that road). S310 may additionally or alternatively include determining heading relative to any road feature, landmark, or other object.

S310 may additionally or alternatively include measuring vehicle velocity and/or speed. Step S310 can include measuring speed by measuring position over time (e.g., as determined using GNSS methods), but may additionally or alternatively include measuring speed in any manner (e.g., by integrating acceleration as measured by the accelerometer over time, by querying a vehicle speedometer).

S320 can include receiving pre-existing map data. S320 functions to receive pre-existing data (i.e., data existing prior to execution of S320) describing the area the vehicle is traveling in.

Pre-existing map data may include any data relevant to an area around or near vehicle position. Pre-existing map data can include a map of roads (e.g., the roads the vehicle is traveling on) with corresponding location information, but may additionally or alternatively include weather data, altitude data, point of interest data, etc. Pre-existing map data may additionally or alternatively include any information relevant to mapping; for example, pre-existing map data may include images of a road surface linked to locations along the road (e.g., a set of images taken at particular positions and orientations along the road) and/or LIDAR maps of a given area.

Pre-existing map data may be used for a number of purposes. For example, pre-existing map data may be used to aid in the generation of the local map (S350). In one example, pre-existing map data can be used to provide a first estimate of location, which is then refined during generation of the local map. In this example, location may be estimated by, for instance, comparing image data to pre-existing image data (e.g., of a building, of the road surface, etc.) known to correspond to a particular location. Alternatively, pre-existing map data may be used to refine an estimate of location. For example, the method 300 may include receiving an initial estimate of position (e.g., via GPS), requesting and receiving pre-existing data corresponding to the position estimate (e.g., image data linked to positions within a region surrounding the position estimate), and using the pre-existing data (e.g., by comparing it to current road surface images and receiving the linked position data for matching images), providing a more accurate position estimate than via the first estimate alone. S320 may include processing data in any manner (e.g., there may not be a precise match between a road surface image and a pre-existing road surface image, but image warping techniques can be used to correct for differences in perspective; these techniques can also identify a correction to position from the position linked to the pre-existing road surface image based on the warping transformation required to match the perspective of the current road surface image).

Pre-existing map data may also be used to calibrate sensors. For example, a set of road surface images may be linked to a precisely known location. This map data may be used to calibrate a GPS receiver of the vehicle (i.e., when the vehicle image sensor captures an image substantially similar to one of the set of road surface images, the GPS receiver can be calibrated using the precisely known location linked to that road surface image).

Pre-existing map data may be used for comparison purposes; for example, to track changes in an environment over time. Comparison of pre-existing map data to current map data may provide insight into myriad driving-related factors; for example, commercial/residential/industrial development, road surface conditions, weather conditions, traffic conditions, etc. For example, the method 300 may include comparing current data to pre-existing data to identify if a business has moved based on signs, building lighting, foot traffic, etc.

Pre-existing map data may also be used to supplement the local map. For example, pre-existing map data may be used as an alternative to local map data outside of a certain range (e.g., beyond a mile from the vehicle). As another example, pre-existing map data may be used to add information to the local map (e.g., gas station or other point of interest locations).

In one example, pre-existing map data can be used in concert with image data from a rear-facing camera to provide predictions of local maps (e.g., lane markers) to the front of the vehicle. In this example, the rear-facing camera image data may be used (independently or with another localization technique such as GPS) to localize the vehicle (either globally or locally) and retrieve information about local maps (from pre-existing map data) in front of the vehicle (which can be used to navigate the vehicle within a lane, for instance). Alternatively, the rear-facing camera image data may be used with models that predict the lane boundaries in front of the vehicle and be based on image data taken from the rear of the vehicle.

Pre-existing map data can be used when available, but may additionally or alternatively not be used (e.g., if GPS data is not available) for any reason.

S330 can include imaging a road surface. S330 functions to capture image data that may be used for vehicle localization purposes. S330 may additionally or alternatively include imaging other aspects of the vehicle's surroundings (e.g., other cars, street signs, buildings on the side of the road), image data of which may be used for vehicle localization, guidance, and/or other purposes. Note that image data as referred to throughout this specification may include any image and/or pseudo-image data as appropriate (e.g., RGB image data, infrared image data, LIDAR data, radar density estimate data, depth camera data, etc.).

S330 can include imaging the road surface with at least two cameras; one front-mounted camera and one rear-mounted camera. Additionally or alternatively, S330 may include imaging the road surface with any number of cameras mounted in any manner and location. Cameras can be configured (through positioning, focus, lens choice, etc.) to provide road surface image data for road surface between five and fifty feet from the vehicle; additionally or alternatively, cameras may capture road image data of road surfaces at any distance or range of distances from the vehicle.

S330 can include capturing images at 30 frames per second or higher; alternatively, S330 may include capturing images at any rate. If S330 includes capturing images from multiple cameras, S330 may include synchronizing cameras to capture images at substantially same times; alternatively, cameras may be unsynchronized.

S330 can include capturing visible light color images; additionally or alternatively, S330 may include capturing any manner of image (e.g., monochrome visible light, infrared, depth map, etc.).

S330 can include capturing two-dimensional images, but may additionally or alternatively include capturing three-dimensional images (e.g., via stereo, assisted stereo, structured light, and/or time of flight techniques).

S340 can include processing road image data. S340 functions to transform road image data captured in S330 (potentially in combination with other data) into localization, guidance, and/or mapping data.

S340 can include one or more of performing image distortion correction S341, performing image filtering S342, performing image data fusion S343, performing image stitching S344, and performing feature detection S345. S340 may additionally or alternatively include any other processing of road image data or related data.

S341 can include performing image distortion correction. S341 functions to transform image data in response to image distortion occurring from camera configuration (e.g., distortion from a wide-angle lens), vehicle motion, vehicle orientation, and/or other imaging system/environmental properties.

S341 can include performing image distortion correction in order to increase accuracy of image-based localization and/or guidance; for example, if lane markers are imaged improperly, distance from the markers or orientation relative to the markers may be misjudged.

In one example, S341 can be used to correct pitch and roll error; that is, image distortion due to vehicle roll (e.g., due to turning) or vehicle pitch (e.g., due to acceleration or braking). S341 may additionally or alternatively be used to correct any type of image distortion; e.g., image distortions due to lensing, reflection, refraction, sensor noise, and/or occlusions on camera lenses.

S341 may include performing image distortion correction with a number of techniques, including external-data-based techniques, model-based techniques, and/or multi-image-based techniques.

External-data-based techniques can include techniques that make use of data external to image data to correct image data. For example, S341 may include performing pitch/roll correction for images based on data from an inertial measurement unit (IMU) or on other data that may be correlated to pitch and/or roll (e.g., acceleration/deceleration as measured by a GPS receiver or by internal vehicle sensors).

Model-based techniques include techniques that make use of image models; that is, sets of data that describe how an image (or features within an image) should look. For example, a model for lane markers may include parameters for the shape of lane markers as well as for camera configuration and location. If an imaged lane marker deviates from the model, this may be an indication of image distortion.

Model-based techniques may include comparing image data to static models (e.g., static lane marker proportion data) or to dynamic models (e.g., models developed or updated by machine learning techniques).

Model-based techniques may take as input any number of parameters, for instance, an example dynamic model may take as input an estimated pitch and roll (e.g., from an IMU), and refine the pitch and roll estimates through a minimization process (or other optimization process) operating on an imaged lane marker and the output of the model (e.g., the first estimate of pitch and roll is the starting point for the model, and the model iteratively refines the pitch and roll estimates to make the model output most closely match the detected feature).

Multi-image techniques can include techniques that make use of multiple images to perform distortion correction. While the previous techniques may be used on single or multiple images, multi-image techniques are specifically techniques that rely on the relationship between images captured at successive times in order to perform image correction. For example, multi-image techniques may include averaging over several image frames to remove small pitch/roll errors. As another example, multi-image techniques may include comparing portions of an image to a successive image; rapid, large changes in an image may be an indication of distortion or sensor error.

S341 may include performing image distortion correction from any combination of techniques; for example, S341 may include correcting image distortion based on a model that describes lane marker motion (as detected over multiple image frames) based on external data. In this example the model may expect lane markers to be transformed in a particular way across image frames based on the detected speed of the vehicle, steering wheel position (or other measure of orientation, such as wheel angle of the wheels used to steer the car) and the frame rate of the camera.

In some examples, a dynamic model used can calculate an expected time distortion contribution; i.e., how much it is expected that model output will change over time based on some parameters, such as vehicle speed, steering wheel angle, vehicle wheel angle, accelerometer data, etc.

S341 can include transforming images to correct image distortion, but may additionally or alternatively include simply generating data describing distortion present in an image and/or possible corrections. For example, a distorted image may be processed by appending or linking a dataset describing distortions present within the image without modifying the original image data.

S341 may be performed at any time using any suitable image data, depending on the technique used. For example, an averaging technique may be performed on raw image data immediately after image capture. As another example, a technique that performs image distortion correction based on lane marker models may be performed after feature detection (which may identify lane markers within images).

In some cases, S341 may be performed concurrently with or as part of other tasks (e.g., distortion may be corrected for as part of a minimization algorithm for performing vehicle localization in S350).

S342 can include performing image filtering. S342 functions to enable removal (or ignorance) of undesired features, properties, or occlusions within images. For example, S342 may include detecting a non-road-surface (e.g., a car) in a rear-view camera and filtering out that surface from the image (e.g., by designating that the road-surface feature detector ignore that section of the image). S342 may include performing any type of image filtering; for example, S342 may include performing optical flow filtering to identify objects within camera view that are traveling at non-zero speed relative to the road surface (e.g., a car, a moving object in the road, etc.).

S343 can include performing image data fusion. S343 functions to fuse image data from multiple sensors to produce new image data; for example, S343 may include using stereo techniques to generate depth information from two front-mounted cameras. As another example, S343 may include correlating LIDAR range data to a 2D visible light image to generate 3D image data. As a third example, S343 may include fusing an infrared image and a visible light image to form a hyperspectral image. As a fourth example, S343 may include averaging image data between two cameras placed closely together (e.g., to reduce sensor noise). S343 may include performing image fusion in any manner.

S344 can include performing image stitching. S344 functions to combine multiple image frames to generate a larger image. This larger image may be useful in generating a local map (as in S350).

S344 can include performing image stitching based on one or a combination of pixel matching, feature matching, and external-data-based alignment.

Pixel matching refers to an image stitching technique that aligns images based on an algorithm that attempts to minimize the difference in pixel values in overlapping image regions. Feature matching refers to an image stitching technique that includes performing feature detection (as in S345) and aligning images based on detected features. External-data-based alignment refers to using non-image data to perform alignment; for example, an overlap between two images taken successively may be estimated using change in vehicle position (e.g., as measured by velocity) between the two images. External-data-based alignment, if used, can be used as a first estimate for other image stitching techniques (but may additionally or alternatively be used in any manner).

S344 can be performed substantially in real-time, but may additionally or alternatively be performed at any time (e.g., in some cases it may be used for global map generation but not for local map generation). S344 can be performed using temporally successive images, but may additionally or alternatively be used with images of a location taken in the past. For example, if a panorama of road surface is desired but a particular piece of image data is missing, image data taken at previous times may be used to fill in gaps (or for any other purpose).

S344 may be performed per camera (i.e., image stitching occurs for images taken from one perspective) but may additionally or alternatively be performed across cameras (i.e., image stitching occurs for images taken from multiple cameras and/or perspectives). In some cases, a rear-facing camera may be used to provide image data for localization and/or navigation as a supplement or as a replacement to image data from a front-facing camera (e.g., if the front-facing image is washed out due to lighting conditions).

In some cases, S344 may be performed concurrently with or as part of other tasks (e.g., feature detection of S345 may be used to perform image stitching).

S345 include performing feature detection. S345 functions to detect features present in image data captured in S330. S345 can include detecting lane markers on road surfaces, but may additionally or alternatively include detecting any image feature (e.g., cars, street signs, potholes, reflections, etc.).

Features detected by S345 can be used to aid in generating the local map of Step S350, but may additionally or alternatively be used in any other manner (e.g., in correcting for pitch/roll error).

In one embodiment, S345 can include performing feature detection for lane markers using multiple binary feature detectors.

For example, S345 may include, for each pixel in an image (or for a subset of pixels; e.g., pixels above some absolute threshold intensity or pixels in an area of interest), measuring difference in intensity between the pixel and a pixel some number of pixels to the left. This distance (i.e., the number of pixels) will henceforth be referred to as dx. Dx can correspond to the width of a lane marker as imaged by the camera (e.g., a number of pixels corresponding to a width of 4-6 inches). If the intensity difference passes a threshold value (that can correspond to the difference in intensity between road surface and lane marker paint), the feature is detected; that is, the pixel is identified as potentially belonging to a lane marker. This process also can be performed based on the difference in intensity between the pixel and another pixel; this other pixel located a distance of dx to the right. Note that the pixel distance dx can be computed using a transformation that accounts for the parameters of the imaging system (e.g., the 6-axis position and orientation of the imaging system relative to the vehicle and relative to the road surface); for example, at the bottom of an image (i.e., closest to the vehicle for a downward angled camera), dx for a lane marker width of four inches may be 200 pixels, while in the middle of the image (depending on, for example, the angle of the road surface relative to the camera), dx for a lane marker width of four inches may be only 50 pixels.

Further note that intensity differences may be signed (e.g., potentially causing the feature detector operating on a white pixel with a black pixel dx away may result in a true value, but operating on a black pixel with a white pixel dx away may result in a false value) or unsigned.

The method 300 may additionally or alternatively include modifying the feature detectors to account for changing road surface slope (i.e., grade); for example, the method 300 may determine from one set of local image data (e.g., LIDAR) that road slope changes within the imaging view (e.g., of an RGB camera) and may calculate dx based not just on position within the imaging view, but also on known road slope (or road slope change).

In this example, S345 may include repeating this process for distances of 2dx to the left and the right (or any other distance value). In this case, the different distances may be assigned different confidence levels; that is, the 2dx process may be more likely to detect lane marker pixels, but may also be more likely to generate false positive results (than the dx process). Further, S345 may include using a vertical feature detector (in contrast to the horizontal detectors described in the preceding two paragraphs) to provide additional confidence to feature detection; for instance, a set of pixels that satisfy the horizontal feature detection constraints may be eliminated if they are not vertically near other pixels satisfying those constraints (the vertical axis of the image corresponding to the direction of travel of the car). From these feature detectors, a set of binary maps may be generated for both dx and 2dx, which may then be used in local map generation.

Note that for multiple feature detectors (operating with multiple 'width' parameters as described above), it may be possible to generate scaled pixel 'widths' simply by scaling the first generated pixel width (as opposed to scaling the actual width and calculating the transformed pixel width directly for each width). Alternatively, pixel widths may be generated in any manner.

S345 may additionally or alternatively include using region-growing techniques to identify features. For example, the two binary maps discussed above may be merged using a region-growing technique, wherein areas of low-confidence pixels are only considered as feature areas if they couple or overlap with areas of high confidence pixels.

S345 may include detecting image features using any other suitable feature detection techniques (e.g., color matching, edge/corner/blob detectors, machine-learning-based techniques). Image feature detection techniques need not necessarily be binary (e.g., in the dx example, a pixel could receive a scaled score based on intensity difference rather than a binary value).

In one example, S345 can include generating expected features (e.g., expected lane markers at particular locations) based on previously captured data (e.g., recently captured road surface data or the 'pre-existing data' received in S320). These predicted features may in turn be used to more efficiently search for features in S340.

The parameters of feature detection may vary based on external parameters. For example, S345 may include lowering feature detection thresholds if it is cloudy outside (e.g., as determined by weather, a photodetector, etc.). This may be determined, for example, by measuring the average intensity of an image. As another example, S345 may include altering feature detection thresholds based on vehicle speed.

S350 can include generating a local map. S350 functions to create a map of features in proximity to a vehicle. S350 can include generating a local map of lanes in front of a vehicle to aid in assisted cruise control, but may additionally or alternatively generate local map data of any features for any purpose.

For example, S350 may include imaging road surface near the vehicle and correlating this to a global map (e.g., via latitude and longitude) so that road surface images may be used to supplement GPS data on future trips (or for other cars, etc.). Note that the term "global map" here refers to a map of features (or any other map) extending beyond a certain proximity of the vehicle; for example, a city street map. Global maps can be referenced to a fixed point, while local maps can be referenced to the vehicle. Additionally or alternatively, global and local maps may be referenced to any coordinates (or may be referenced in any other manner).

S350 can include generating a local map of road features (e.g., lanes) from features detected in images captured by S330, but may additionally or alternatively include generating a local map using any suitable data. For example, S350 may include generating a local map based on a combination of image data and GPS data (and/or IMU data).

In one example of an invention embodiment, S350 can include identifying a lane demarcated by detected lane markers (e.g., by interpolating between lane markers).

S350 can include generating local map data by converting pixel offsets into distances (using known camera configuration parameters, 3D imaging techniques, or any other suitable method).

S350 can include generating local map data in a manner robust to pitch/roll error. For example, S350 may include generating a local map starting from the bottom of the image frame (that is, the area of the image frame closest to the vehicle), which is generally less susceptible to pitch error. S350 may additionally or alternatively include integrating other techniques for reducing pitch/roll/yaw error (such as those described previously).

In one example, S350 can include generating a local map identifying a lane by computing estimated lane boundaries for several successive (or otherwise captured-close-in-time) image data frames and determining the lane boundaries (relative to the vehicle) from an average of the multiple lane boundary estimates.

In one example, S350 can include generating a local map using a Kalman filter operating on processed image data and GPS receiver data. S350 may additionally or alternatively include generating a local map using any suitable technique, such as utilizing one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 300 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the method 300. Further, any suitable model (e.g., machine learning, non-machine learning, etc.) can be used in generating local maps and/or other data relevant to the method 300.

S350 may additionally or alternatively include generating a local map based on local map models. For example, local map generation may be constrained by known road standards (e.g., maximum allowed curvature of a highway, known turning radii, lane marker separation requirements).

S350 may additionally or alternatively include linking local map features. For example, features (e.g., lane markers) may be linked to each other, allowing their presence, location, and/or shape to be inferred. This may be used, for instance, to allow lane markers to be inferred even if they are occluded (e.g., by a car) or otherwise difficult to detect (e.g., due to lighting issues). Lane markers may be inferred or linked in any manner (e.g., using a model of lane markers that includes separation between lane markers, allowing probably lane marker locations to be generated based on detected lane markers).

In some cases, S350 can include generating different local maps for different imaging areas (e.g., corresponding to differing distances). For example, S350 may include mapping multiple road features for distances less than 30 feet, while only mapping lane markers (or inferring lane markers) for distances greater than 30 feet from the vehicle.

Traffic Object Mapping:

In an autonomous vehicle environment (100), the environment itself continuously changes over time, which may influence updates to local or global maps of the autonomous vehicle environment (100). For example, traffic object position, type, and lane association can change abruptly due to construction or a car accident. Traffic objects can include traffic signs, traffic signals, traffic lights, traffic cones, vehicles, fire hydrants, bike racks, constructions signs, constructions barriers, construction objects, or any other traffic object suitable for the intended purpose and understood by a person of ordinary skill in the art.

If traffic object maps are not updated accordingly, the autonomous vehicle (102) may not be able to detect a traffic object. For example, according to the autonomous vehicle's (102) current map, a stop sign should be at an intersection, when in actuality, the stop sign has been replaced with a traffic light because of construction. Without the method described below, the autonomous vehicle (102) might enter into the intersection upon determining it had sufficiently waited at the stop sign, but instead, is running a red traffic light. Alternatively, the autonomous vehicle (102) might perform an emergency stop upon failing to detect the stop sign. As such, a method for detecting changes in traffic objects is needed to enable autonomous vehicles (102) to perform appropriately within a changing autonomous vehicle environment (100).

Traffic object position information also can be seeded with onboard perception models configured to receive live traffic object information from camera data (104-108). Traffic objects can be mapped as priors for autonomous vehicles (102). For example, for a traffic light, if the traffic light is missing from an expected position, object detection models can be utilized to determine candidates on how to proceed.

The system described herein can use the bearing from the candidates and the previous position of the traffic objects to compute a new position. In one embodiment, as the traffic object is passed by the autonomous vehicle (102), 2D detections from a "broken" traffic object can be aggregated and data tagged accordingly. Thereafter, the new position of the broken traffic object can be determined, processed, and traffic object maps updated accordingly. Workflows also can automatically update traffic object location based on autonomous vehicle (102) detection and tracking. Artificial intelligence and machine learning also can be utilized in the detection of traffic objects and updating of traffic object maps.

Figure 4A:
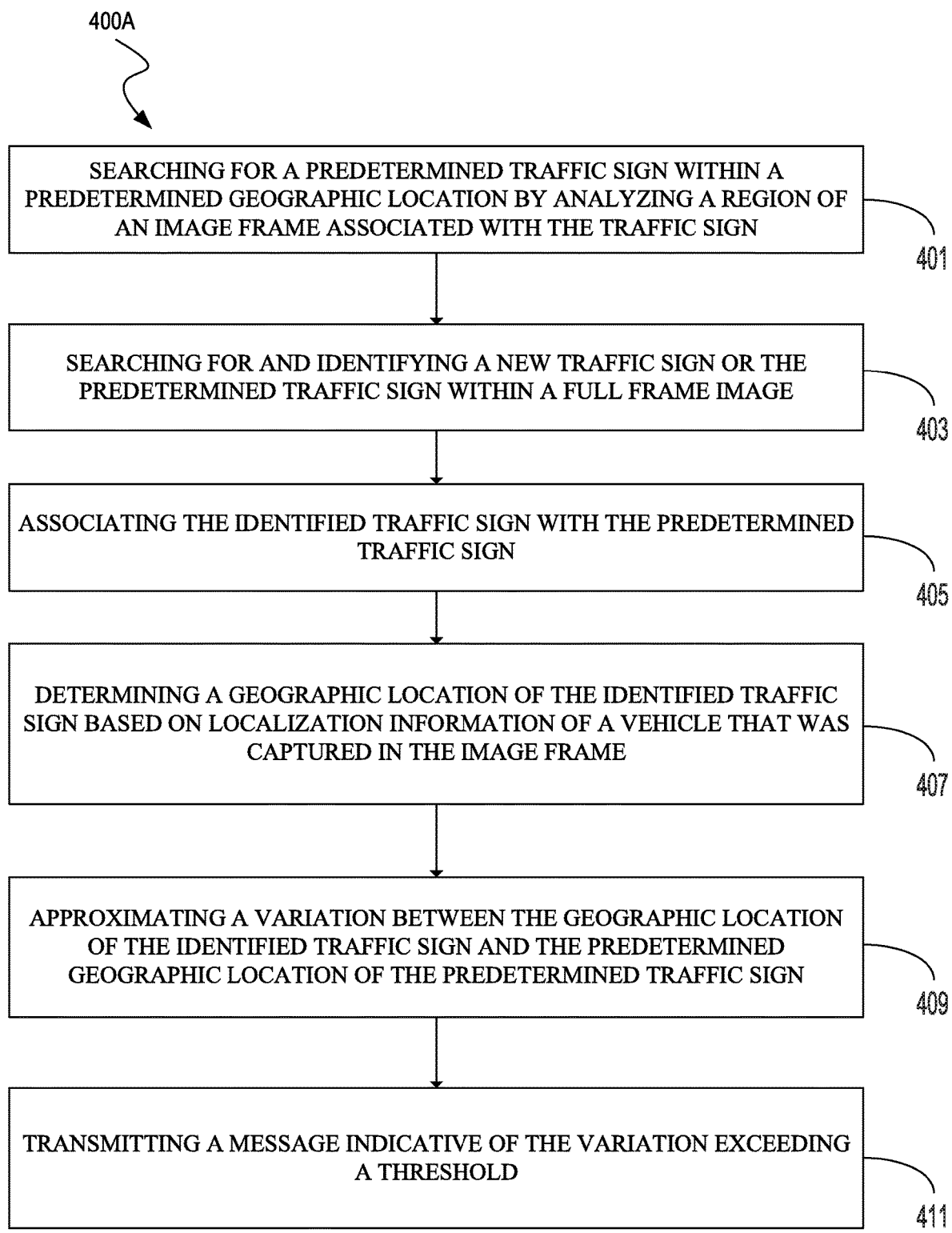
FIGS. 4A and 4B illustrate example methods for managing traffic signal location discrepancies, in accordance with some examples.
Figure 4B:
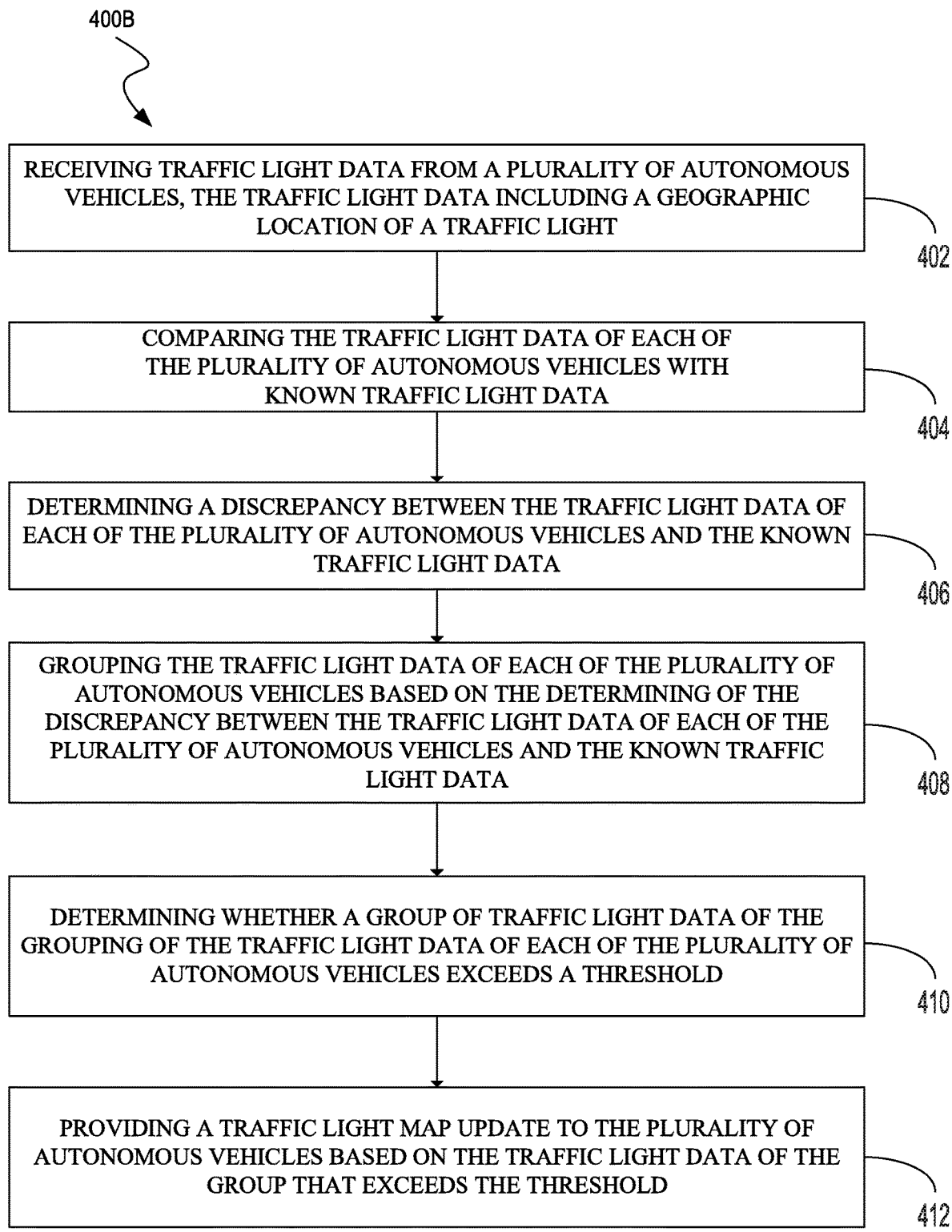

Having disclosed some example system components and concepts, the disclosure now turns to FIGS. 4A and 4B, which illustrate example methods 400A and 400B for managing traffic object discrepancies. The steps outlined herein are exemplary and can be implemented in any combination thereof, including combinations that exclude, add, or modify certain steps. Embodiments may refer to a traffic light, a traffic signal, or a traffic sign, but any traffic object as described in this disclosure can be utilized in any of the embodiments described herein.

At step 401, the method 400A can include searching for a predetermined traffic sign within a predetermined geographic location by analyzing a region of an image frame associated with the traffic sign. The image frame can be captured by a localized vehicle. For example, the vehicle can be localized (i.e., have a known location/orientation) by determining a location of an identified traffic sign in a full frame image. The image frame also can be a partial frame, a full frame image, or any other frame image suitable for the intended purpose and understood by a person of ordinary skill in the art.

At step 403, the method 400A can include searching for and identifying a new traffic sign or the predetermined traffic sign within a full frame image. The method 400A further can include searching and identifying the traffic sign within a plurality of full frame images.

At step 405, the method 400A can include associating the identified traffic sign with the predetermined traffic sign.

At step 407, the method 400A can include determining a geographic location of the identified traffic sign based on localization information of the vehicle that was captured in the image frame.

At step 409, the method 400A can include approximating a variation between the geographic location of the identified traffic sign and the predetermined geographic location of the predetermined traffic sign. For example, the step 409 can be performed by determining locations of the identified traffic sign over a plurality of full frame images and determining an average location. The determined average location can then be used to determine a variation between the identified traffic sign and the predetermined traffic sign.

At step 411, the method 400A can include transmitting a message indicative of the variation exceeding a threshold. The threshold can be a predetermined threshold or based on localization information of the vehicle. The message can trigger a manual or automated review procedure or cause an automated local or global map update. The vehicle can additionally/alternatively update an on-board map accordingly.

At step 402, the method 400B can include receiving traffic light data from a plurality of autonomous vehicles (102) by a monocular camera (e.g., a single camera that is capable for receiving positional data and angular data), the traffic light data including a geographic location of a traffic light. The traffic light data can be received by the sensors (104-108) of the autonomous vehicles (102). For example, while the fleet of autonomous vehicles (102) are actively driving, the sensors (104-108) can detect and/or determine the presence of a traffic light and its corresponding features such as traffic light lane association, angle of the traffic light, position of the traffic light, type of the traffic light, duration of the traffic light, color of the traffic light, or any other traffic light data suitable for the intended purpose and understood by a person of ordinary skill in the art.

The type of the traffic light can include arrow-type traffic lights and arrowless-type traffic lights. For example, at a given time, a traffic light can include an arrow-style signal. However, at a different time, the traffic light may be replaced or moved such that the traffic light does not include an arrow-style signal. If the fleet of autonomous vehicles (102) is not made aware of this change, the autonomous vehicles may proceed into an intersection inadvertently.

At step 404, the method 400B can include comparing the traffic light data of each of the plurality of autonomous vehicles (102) with known traffic light data. The known traffic light data can be obtained from the sensors (104-108) of the fleet of autonomous vehicles (102), internal maps, third party vendor maps, or any other map suitable for the intended purpose and understood by a person of ordinary skill in the art.

At step 406, the method 400B can include determining a discrepancy between the traffic light data of each of the plurality of autonomous vehicles (102) and the known traffic light data. The discrepancy between the traffic light data of each of the plurality of autonomous vehicles (102) and the known traffic light data can be a value that corresponds to the difference between the received traffic light data of the plurality of autonomous vehicles (102) and the known traffic light data. For example, the value of the discrepancy can be a binary value (e.g., 0—indicating no change; and 1—indicating a change), a percentage value (e.g., a percentage of change of an angle of the traffic light), a range value (e.g., the degree or extent of change from the previously known traffic light data), or any other value suitable for the intended purpose and understood by a person of ordinary skill in the art.

At step 408, the method 400B can include grouping the traffic light data of each of the plurality of autonomous vehicles (102) based on the determining of the discrepancy between the traffic light data of each of the plurality of autonomous vehicles (102) and the known traffic light data. In some instances, one group of autonomous vehicles (102) may indicate a change in the traffic light, while others do not. For example, the autonomous vehicles (102) that have indicated a change in the traffic light data can be Group A, while the autonomous vehicles (102) that have indicated no change in the traffic light data can be Group B. Group A and Group B can then be compared to one another and to the previously known traffic light data to determine which group is more accurate. The grouping of the traffic light data also can be based on a percentage of difference between the traffic light data from the plurality of autonomous vehicles (102) and the known traffic light data. For example, 25% of the autonomous vehicles (102) that indicated a change in the traffic light can be in Group A, while 75% of the autonomous vehicles (102) that indicated no change in the traffic light can be in Group B. The percentage of difference also can include the degree of change in the traffic light (e.g., angle of the traffic light).

At step 410, the method 400B can include determining whether a group of traffic light data of the grouping of the traffic light data of each of the plurality of autonomous vehicles (102) exceeds a threshold. For example, the threshold can be a value (e.g., 500 autonomous vehicles (102) indicated a change in the traffic light), percentage (e.g., 30% of the autonomous vehicles (102) indicated a change in the traffic light), or any other threshold suitable for the intended purpose and understood by a person of ordinary skill in the art. Moreover, the determining of whether a group of traffic light data exceeds a threshold can be determined with artificial intelligence or machine learning to adapt changes in real-time.

At step 412, the method 400B can include providing a traffic light map update to the plurality of autonomous vehicles (102) based on the traffic light data of the group that exceeds the threshold. The providing of the traffic light map update can be provided to the autonomous vehicles (102) remotely immediately or during scheduled updates of the autonomous vehicles (102).

In some cases, the method 400B can further include preparing traffic light data tables that include the traffic light data for each of the plurality of autonomous vehicles (102). The method 400B also can include comparing the traffic light data tables of each of the plurality of autonomous vehicles (102) with a known traffic light data table. The method 400B can further include grouping the traffic light data tables based on a discrepancy level, the discrepancy level being the difference between the traffic light data tables of each of the plurality of autonomous vehicles (102) and the known traffic light data table.

The method 400B also can include replacing the known traffic light data with the traffic light data of the group that exceeds the threshold, thereby updating the traffic light maps of the fleet of autonomous vehicles (102).

In some examples, the remote computing system (150) can be configured to send and receive communications and traffic light data from the autonomous vehicles (102) to facilitate the above-mentioned steps of method 400B. For example, the remote computing system (150) can be configured to perform the receiving of the traffic light data from the plurality of autonomous vehicles 402, the comparing of the traffic light data of each of the plurality of autonomous vehicles with the known traffic light data 404, the determining of the discrepancy between the traffic light data of each of the plurality of autonomous vehicles and the known traffic light data 406, the grouping of the traffic light data of each of the plurality of autonomous vehicles based on the determining of the discrepancy between the traffic light data of each of the plurality of autonomous vehicles and the known traffic light data 408, the determining of whether the group of traffic light data of the grouping of the traffic light data of each of the plurality of autonomous vehicles exceeds the threshold 410, and the providing of the traffic light map update to the plurality of autonomous vehicles based on the traffic light data of the group that exceeds the threshold 412.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 5:
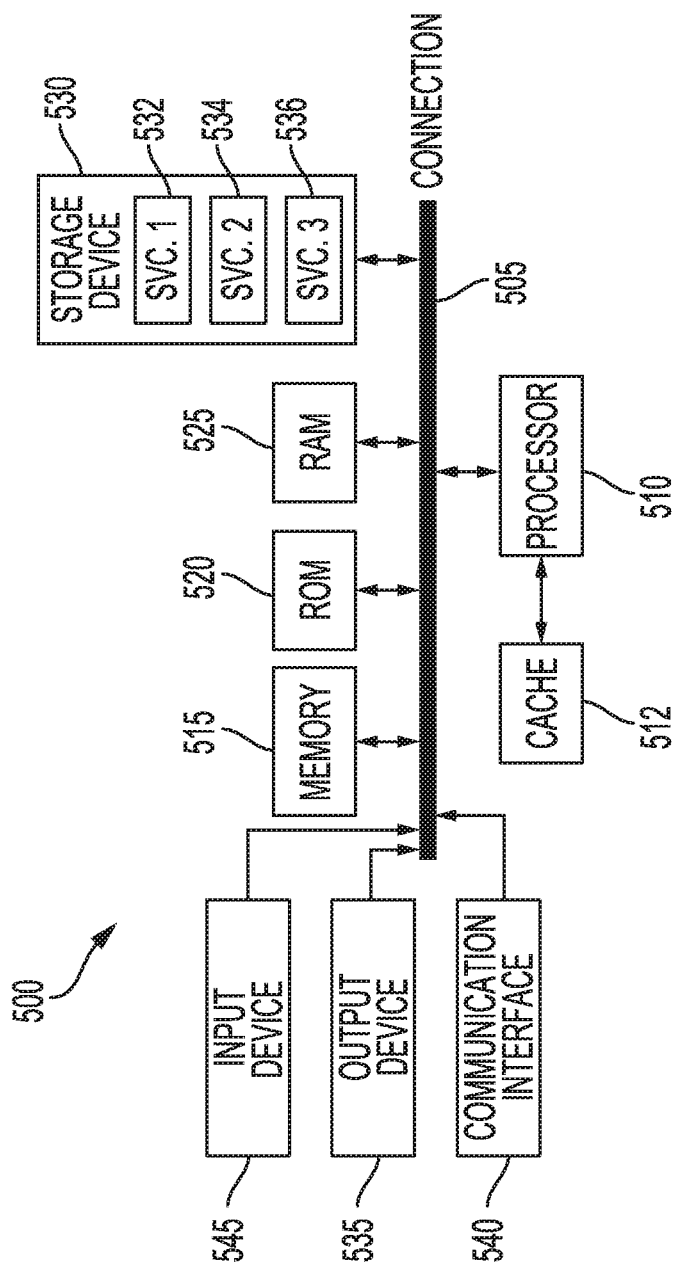
FIG. 5 is a schematic diagram of an example computing device architecture, in accordance with some examples.

FIG. 5 illustrates an example computing system 500 which can be, for example, any computing device making up internal computing system 110, remote computing system 150, a passenger device executing rideshare application 170, or any other computing device. In FIG. 5, the components of the computing system 500 are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
receiving traffic light data from a plurality of autonomous vehicles, the traffic light data including a geographic location of a traffic light;
comparing the traffic light data of each of the plurality of autonomous vehicles with known traffic light data;
determining discrepancy values between the traffic light data of each of the plurality of autonomous vehicles and the known traffic light data, wherein the discrepancy values indicate an extent of change of the traffic light data from the known traffic light data;
grouping the traffic light data of each of the plurality of autonomous vehicles into a first group of traffic light data and a second group of traffic light data based on the determining of the discrepancy values, wherein the first group of traffic light data includes data from autonomous vehicles indicating a first degree of change in traffic light data from the known traffic light data, and wherein and the second group of traffic light data includes data from autonomous vehicles indicating a second degree of change from the known traffic light data;
comparing the first group of traffic light data to the second group of traffic light data to determine that the first group of traffic light data is more accurate;
determining whether the first group of traffic light data exceeds a threshold; and
updating a traffic light map in response to determining that the first group of traffic light data exceeds the threshold.

2. The computer-implemented method of claim 1, further comprising providing a traffic light map update to the plurality of autonomous vehicles based on the updated traffic light map.

3. The computer-implemented method of claim 1, wherein the traffic light data further includes at least one of traffic light lane association, angle of the traffic light, position of the traffic light, type of the traffic light, duration of the traffic light, and color of the traffic light.

4. The computer-implemented method of claim 3, wherein the type of the traffic light includes arrow-type traffic lights and arrowless-type traffic lights.

5. The computer-implemented method of claim 1, further comprising preparing traffic light data tables that include the traffic light data for each of the plurality of autonomous vehicles.

6. The computer-implemented method of claim 5, further comprising comparing the traffic light data tables of each of the plurality of autonomous vehicles with a known traffic light data table.

7. The computer-implemented method of claim 6, further comprising grouping the traffic light data tables based on a discrepancy level, the discrepancy level being the difference between the traffic light data tables of each of the plurality of autonomous vehicles and the known traffic light data table.

8. The computer-implemented method of claim 1, wherein the discrepancy between the traffic light data of each of the plurality of autonomous vehicles and the known traffic light data is a value that corresponds to the difference between the received traffic light data of the plurality of autonomous vehicles and the known traffic light data.

9. The computer-implemented method of claim 1, wherein the first group of the traffic light data is based on a percentage of difference between the traffic light data from the plurality of autonomous vehicles and the known traffic light data.

10. The computer-implemented method of claim 1, further comprising replacing the known traffic light data with the traffic light data of the group that exceeds the threshold.

11. A system comprising:
one or more processors; and
at least one computer-readable storage medium having stored therein instructions which, when executed by the one or more processors, cause the system to:
receive traffic light data from a plurality of autonomous vehicles, the traffic light data including a geographic location of a traffic light;
compare the traffic light data of each of the plurality of autonomous vehicles with known traffic light data;
determine discrepancy values between the traffic light data of each of the plurality of autonomous vehicles and the known traffic light data, wherein the discrepancy values indicate an extent of change of the traffic light data from the known traffic light data;
group the traffic light data of each of the plurality of autonomous vehicles into a first group of traffic light data and a second group of traffic light data based on the determination of the discrepancy values, wherein the first group of traffic light data includes data from autonomous vehicles indicating a first degree of change in traffic light data from the known traffic light data, and wherein the second group of traffic light data includes data from autonomous vehicles indicating a second degree of change from the known traffic light data;
compare the first group of traffic light data to the second group of traffic light data to determine that the first group of traffic light data is more accurate;
determine whether the first group of traffic light data exceeds a threshold; and
update a traffic light map in response to determining that the first group of traffic light data exceeds the threshold.

12. The system of claim 11, wherein the instructions which, when executed by the one or more processors, further cause the system to provide a traffic light map update to the plurality of autonomous vehicles based on the updated traffic light map.

13. The system of claim 11, wherein the traffic light data further includes at least one of traffic light lane association, angle of the traffic light, position of the traffic light, type of the traffic light, duration of the traffic light, and color of the traffic light.

14. The system of claim 13, wherein the type of the traffic light includes arrow-type traffic lights and arrowless-type traffic lights.

15. The system of claim 11, wherein the instructions which, when executed by the one or more processors, further cause the system to prepare traffic light data tables that include the traffic light data for each of the plurality of autonomous vehicles.

16. The system of claim 15, wherein the instructions which, when executed by the one or more processors, further cause the system to compare the traffic light data tables of each of the plurality of autonomous vehicles with a known traffic light data table.

17. The system of claim 16, wherein the instructions which, when executed by the one or more processors, further cause the system to group the traffic light data tables based on a discrepancy level, the discrepancy level being the difference between the traffic light data tables of each of the plurality of autonomous vehicles and the known traffic light data table.

18. The system of claim 11, wherein the discrepancy between the traffic light data of each of the plurality of autonomous vehicles and the known traffic light data is a value that corresponds to the difference between the received traffic light data of the plurality of autonomous vehicles and the known traffic light data.

19. The system of claim 11, wherein the groups of the traffic light data is based on a percentage of difference between the traffic light data from the plurality of autonomous vehicles and the known traffic light data.

20. The system of claim 11, wherein the instructions which, when executed by the one or more processors, further cause the system to replace the known traffic light data with the traffic light data of the group that exceeds the threshold.

21. A non-transitory computer-readable storage medium comprising:
instructions stored on the non-transitory computer-readable storage medium, the instructions, when executed by one more processors, cause the one or more processors to:
receive traffic light data from a plurality of autonomous vehicles, the traffic light data including a geographic location of a traffic light;
compare the traffic light data of each of the plurality of autonomous vehicles with known traffic light data;
determine discrepancy values between the traffic light data of each of the plurality of autonomous vehicles and the known traffic light data, wherein the discrepancy values indicate an extent of change of the traffic light data from the known traffic light data;
group the traffic light data of each of the plurality of autonomous vehicles into a first group of traffic light data and a second group of traffic light data based on the determination of the discrepancy values, wherein the first group of traffic light data includes data from autonomous vehicles indicating a first degree of change in traffic light data from the known traffic light data, and wherein the second group of traffic light data includes data from autonomous vehicles indicating a second degree of change from the known traffic light data;
compare the first group of traffic light data to the second group of traffic light data to determine that the first group of traffic light data is more accurate;
determine whether the first group of traffic light data exceeds a threshold; and
update a traffic light map in response to determining that the first group of traffic light data exceeds the threshold.

22. The non-transitory computer-readable storage medium of claim 21, wherein the traffic light data further includes at least one of traffic light lane association, angle of the traffic light, position of the traffic light, type of the traffic light, duration of the traffic light, and color of the traffic light.

* * * * *